United States Patent
Ullmann et al.

[15] 3,655,937
[45] Apr. 11, 1972

[54] ARRANGEMENT OF AT LEAST TWO NON-STORAGE PULSE GENERATORS FOR ELECTRO-EROSION MACHINING

[72] Inventors: Werner Ullmann, Locarno-Muralto; Costantino Tadini, Locarno; Ehsan Salim, Locarno-Muralto, all of Switzerland

[73] Assignee: AG fur industrielle Elektronik AGIE, Losone bei Locarno, Losone, Switzerland

[22] Filed: July 13, 1970

[21] Appl. No.: 54,383

[30] Foreign Application Priority Data

Aug. 26, 1969 Switzerland ..................12924/69

[52] U.S. Cl. ............................................. 219/69 P
[51] Int. Cl. ............................................. B23p 1/08
[58] Field of Search ..................... 219/69 C, 69 R, 69 P

[56] References Cited

UNITED STATES PATENTS 2,895,080 7/1959 Branker..........................219/69P X

FOREIGN PATENTS OR APPLICATIONS 1,535,301 6/1968 France.........................219/69 P

*Primary Examiner*—R. F. Staubly
*Attorney*—Werner W. Kleeman

[57] ABSTRACT

A circuit arrangement for electro-erosion machining operations, comprising at least two non-storing pulse generator means for the electro-erosion machining operations. A controlled timing generator means serves to generate control pulses for all of said pulse generators. There are also provided current circuit means for the time-control of the control pulses delivered by the controlled timing generator means, one such current circuit means being arranged at the input for the control pulses of each of said pulse generator means. There also are provided electro-erosion current circuits, with pulse generators being electrically arranged in said electro-erosion current circuits and being provided with electronic power switches controlled by said control pulses, said electro-erosion current circuits being coupled in such a number in parallel to the work gap as there are required working pulses of different amplitudes for producing a working spark.

5 Claims, 3 Drawing Figures

Patented April 11, 1972

INVENTORS
WERNER ULLMANN
CONSTATINO TADINI
EHSAN SALIM

BY Werner H. Kleeman

ATTORNEY

3,655,937

ARRANGEMENT OF AT LEAST TWO NON-STORAGE PULSE GENERATORS FOR ELECTRO-EROSION MACHINING

BACKGROUND OF THE INVENTION

The present invention relates to an improved circuit arrangement of at least two non-storing impulse generators for electro-erosion machining operations, commonly referred to as EDM.

In the last years development of electro-erosion metal working has been considerably advanced through the use of non-storing transistorized pulse generators. These generators deliver working sparks to the spark gap which can be controlled by control pulses with respect to their repetition frequency, width and duty cycle independently of one another. The working sparks delivered to the spark gap likewise can be controlled with respect to their voltage and current intensity.

Since the field of application of metal removal or erosion by working sparks in the work area has become more extensive, greater requirements have been placed upon quality. Recent investigations of the physical conditions prevailing at the gap have enabled the determination that, it is possible to achieve an appreciable improvement of the erosion operation by providing for a special configuration or form of the sparks i.e. pulses. Thus, generators have become known to the art which consist of two voltage sources with appropriate switches or a transformer with two secondary windings. Consequently, it is possible to achieve, at the beginning of one of each working spark, a higher voltage than the ignition voltage at the work gap, whereas the actual working spark possesses the normal operating voltage. Still, an appreciable improvement could not be thusly obtained since the generator constructed for this purpose, which, as is known, consists of an ignition voltage source and an operating voltage source, or a transformer with two secondary windings, is unable to exert such effect upon the form of the working spark such as would be actually required for a real improvement of EDM.

SUMMARY OF THE INVENTION

Accordingly, a real need exists in the art for circuitry for EDM machines which does not possess the aforementioned drawbacks of the prior art constructions. It is therefore a primary objective of this invention to effectively fulfill this need.

Another, more specific object of the present invention relates to improvements of the known generators used in electro-erosion machining operations.

The inventive circuit arrangement permits carrying out the requisite shaping or forming of the working sparks required for the most different types of erosion machining techniques. It is characterized by the features of a controlled clock or timing generator for generating control pulses for all of the pulse generators, current circuit means for the time-control of the control pulses delivered from the controlled timing generator, a current circuit being arranged at the input for the control pulses of one of each pulse generator. Furthermore, the pulse generators are equipped with electronic power switches in the electro-erosion current circuits which are controlled by the control pulses, wherein the electro-erosion current circuits are connected parallel to the spark gap in such a number as there are required working pulses of different amplitude for a working spark.

By virtue of this circuit arrangement, there is imparted to each working spark the shape or form which is optimum for EDM operations.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
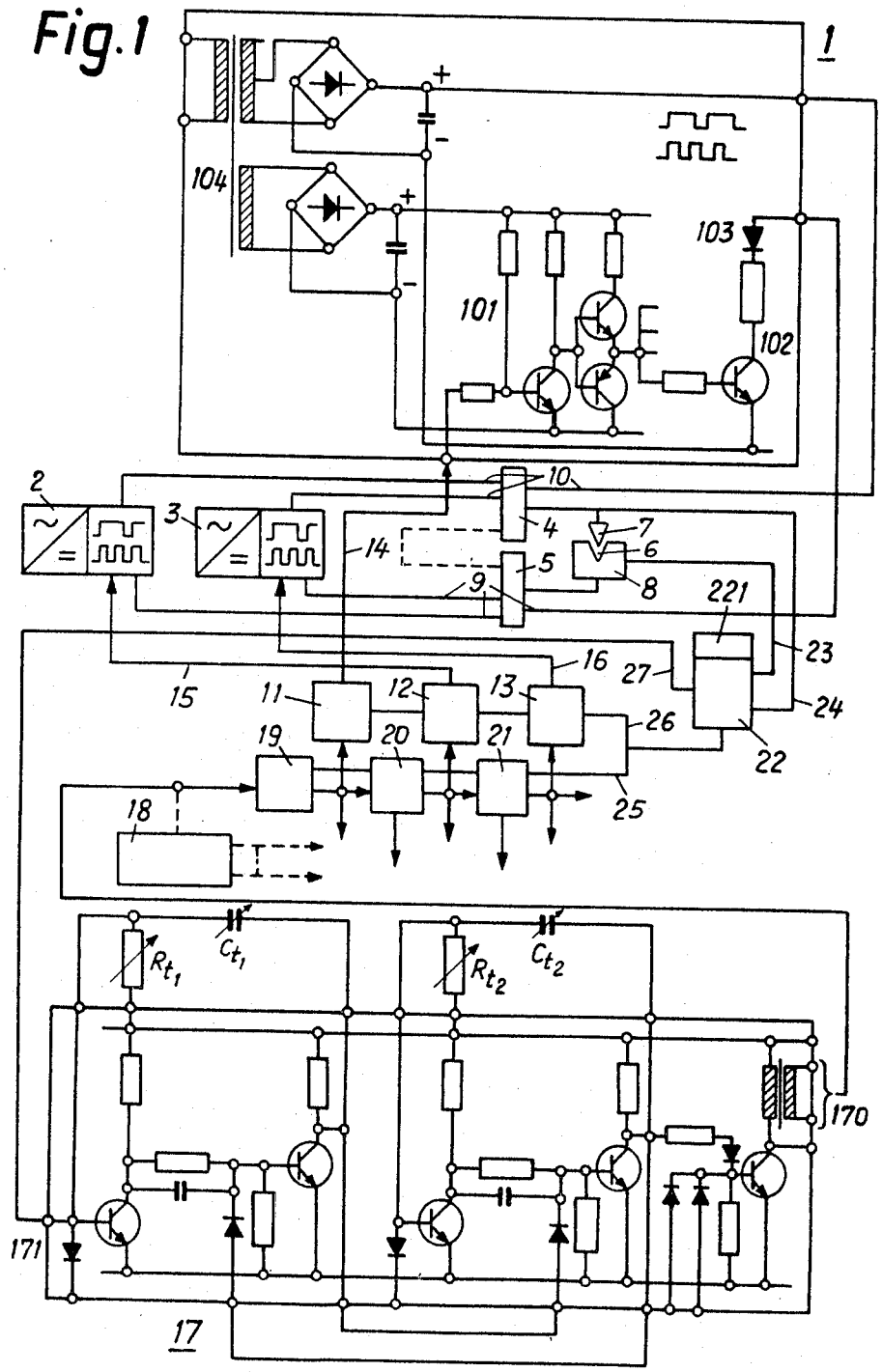
FIG. 1 is a block diagram of the entire circuit arrangement of a preferred embodiment of the invention.

Describing now the drawings, in FIG. 1 the impulse or pulse generators 1, 2, and 3 are coupled at the junction locations or points 4 and 5 in parallel with the work gap 6. The work gap 6 is formed by the work electrode 7 and the workpiece 8. For the sake of clarity in illustration, only three pulse generators have been illustrated in the drawing. The phantom-line illustration at the junctions 4 and 5 schematically indicates the possibility of connecting still further generators. The construction of the individual pulse generators 1, 2 and 3 is well known to those skilled in the art, and will be seen to comprise an amplifier 101 and power transistors 102 arranged in the electro-erosion current circuit means designated by reference numerals 9 and 10. Power transistors 102 are coupled in series in the electro-erosion current circuit means 9 and 10 and are coupled parallel to the output of the amplifier 101. These power transistors can be, of course, connected parallel to the electro-erosion current circuit means and thus to the spark gap 6.

As far as the power transistors 102 are concerned, only one has been shown in FIG. 1. Furthermore, a suitable rectifier 103 is arranged in the electro-erosion current circuit means 9, 10, conducting current in only one direction. Pulse generators of this type have already been described in prior art patents of the same applicant.

Each generator has its own current supply 104, which may consist of a transformer and rectifier arrangement, as shown. As a matter of convenience in illustration, the essential components have only been illustrated with regard to the pulse generator 1. At the control input of each pulse generator 1, 2 and 3 there are connected, via the conductors 14, 15 and 16 respectively, the current circuits 11, 12 and 13 for the time-control of the control pulses delivered by a timing generator 17. The controlled timing or clock generator 17, which, as is known, may consist of a plurality of multivibrators, delivers the control pulses for the generators 1, 2 and 3.

Figure 3:
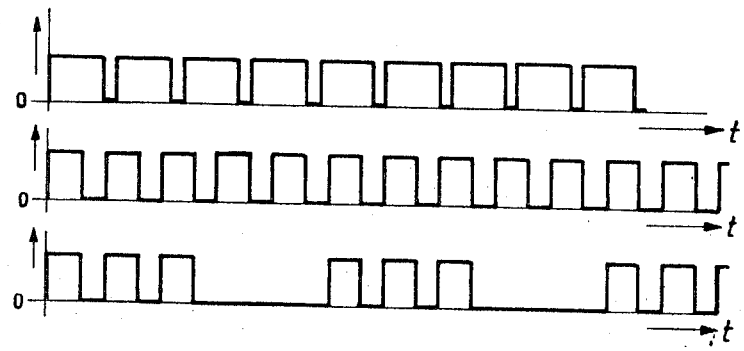
FIG. 3 illustrates different control pulses delivered by the timing generator.

The timing generator 17 is controlled in such a manner that it delivers the control pulses illustrated in FIG. 3 to the current circuits for the time control. These control pulses can be optimumly regulated by the machine operator for each EDM operation. The control pulses are also regulated by means of the combined monitoring device 22 during the erosion machining operation, such monitoring device to be more fully explained hereinafter, so that the working sparks remain optimum during each machining operation. In FIG. 1 there are illustrated further current circuits 19, 20 and 21 for the time-control of the control pulses which are coupled with other non-illustrated pulse generators. The schematically depicted block 18 represents the possibility of connecting additional generators, as such have been shown in dash lines. Also, in such case, time-control circuits are located in front of each generator. Each of the time-control circuits 11, 12, 13, 19, 20 and 21 illustrated in FIG. 1 initiates a time-displacement and/or variation of the pulse width of the control pulses delivered to the output 170 of the timing generator 17. The control pulses can thus be displaced in time while retaining their original pulse width and/or can be shortened with respect to their original width.

The time-control circuits 11, 12, 13, 19, 20 and 21, depicted in FIG. 1, are connected in series or parallel with respect to one another. It is thus to be indicated that each such control circuit brings about a certain time-control of the control pulses. Due to the predetermined arrangement of these time-control circuits, the control pulses delivered by the timing generator 17 are influenced in desired fashion and delivered to the pulse generators. The control pulses arriving at the pulse generators, for instance generators 1, 2 and 3, control the power switches 102, so that working sparks 34 arrive at the gap 6 which are optimumly accommodated to each EDM operation and, thus, to each physical and/or chemical condition prevailing at the work or spark gap 6. These current circuits 11, 12, 13, 19, 20 and 21 depicted in FIG. 1 consist of known relatively simple components, so that each control circuit can be adjusted with respect to a certain time displacement and/or certain change of the pulse width. Naturally, it is possible to construct a time-control current circuit such that it can be optionally adjusted for a number of variable time control operations. In such case, the time-control current circuit will be equipped with a plurality of outputs, so that instead of the illustrated current circuit, there is used one of two current circuit means. The current circuits in their most simple manifestation, as is know, may consist of monostable multivibrators.

In FIG. 1 there is provided a common monitoring device 22 at the spark erosion gap 6, which is coupled via the conductors 24 and 23 with the electrode 7 and the workpiece 8, respectively. The outputs of the monitoring device 22 are connected via conductors 25 and 26 to the current circuits 11, 12, 13, 19, 20 and 21 for the time control of the control pulses delivered by the timing generator 17 and are coupled via the conductor means 27 to the input 171 of the timing generator 17. The monitoring device 22 operates in such a way that upon change of the physical conditions at the work gap 6 which unfavorably influences the electro-erosion machining operation, the timing generator 17 and/or the time-control circuits 11, 12, 13, 19, 20 and 21 are influenced in such a way that the physical conditions prevailing at the spark erosion gap are again normalized. The combined monitoring device 22 is equipped with a program input mechanism 221. A prescribed program for the desired course of the machining operation is delivered to the program-input device 221. It is possible to advantageously employ as the program carrier conventional devices such as punch cards, punch tape, magnetic tape or the like, for instance. The timing generator 17 is controlled via the conductor 27 in accordance with the program as is also conjointly or separately the time-control circuits 11, 12, 13, 19, 20 and 21. The monitoring device 22 determines during the machining operation whether or not the infed program has actually been performed. The monitoring device 22 is also capable of changing the program stored at the programming mechanism 221. This results when, for example, the optimum physical conditions in the spark erosion gap 6 no longer coincide with the program. This will be more readily explained in conjunction with an example. It is to be assumed that the program prescribes that after a certain penetration of the electrode 7 into the workpiece 8, the work sparks or pulses 34 are to be changed. When this point for the change of the work sparks has been reached earlier or later than prescribed by the program, the monitoring device 22 ensures for a program change via the conductors 25, 26 and 27. The timing generator 17 and/or the time-control circuits 11, 12, 13, 19, 20 and 21 are controlled in such a way that the pulse generators 1, 2 and 3, and so forth, deliver "non-programmed" working sparks 34 to the spark gap 6.

By controlling the monitoring device 22 it is possible to change the repetition frequency or pulse width of the control or timing pulses at the timing generator 17 and/or vary the pulse width of the control pulses. Furthermore, it is also possible, for instance, to switch out a portion of the group of pulse generators 1, 2 and 3 for a shorter or longer duration. The thus indicated control possibility is effectuated by the monitoring device 22 on the basis of continuous analysis of the physical conditions prevailing in the spark erosion gap 6 in combination with the program stored in the program storage mechanism 221.

Figure 2:
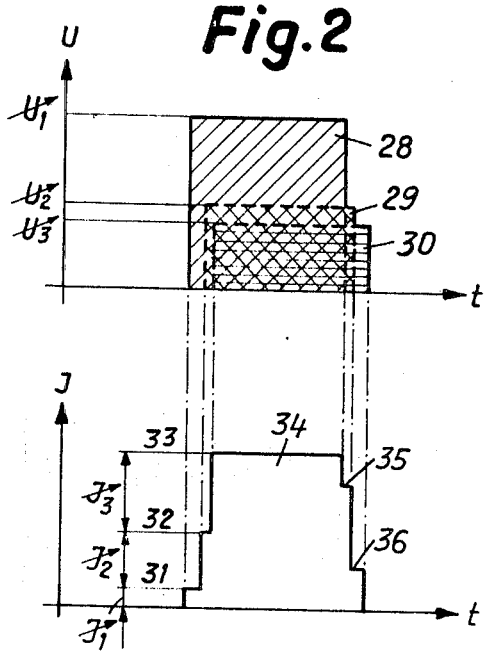
FIG. 2 graphically illustrates a working spark composed of a plurality of working pulses.

In the upper portion of FIG. 2 there are illustrated three working pulses 28, 29 and 30. The voltage values of such have been plotted along the ordinate of the graph and time along the abscissa. Even though only three working pulses have been illustrated in the drawing, it is here to be mentioned that a different or greater number of such working pulses can be provided. The working pulse 28 with the highest voltage is, for instance, delivered by the pulse generator 1 via the erosion current circuit means 9, 10 to the junction location points 4, 5. The generator 2 delivers working pulse 29 via the erosion current circuit means 9, 10 to the same junction points 4, 5. The working pulse 30 is delivered by the pulse generator 3. It is here mentioned that the pulse generators 1, 2 and 3 can be independently adjusted with respect to different voltages and current intensities. Due to the time-control of the control pulses emanating from the time-control current circuits 11, 12 and 13 there is brought about the time displacement of the working pulses 28, 29 and 30, as shown. The superimposed working pulses 28, 29, 30 are then combined together into a single working spark and impart to such a certain shape which can be fixed by the different voltage amplitudes and the time-displacement. In the lower portion of FIG. 2 there have been plotted the current values along the ordinate and the time along the abscissa. The step-shape of the here illustrated working pulse is derived from the different current values, which can be regulated independently of one another by the pulse generators 1, 2 and 3.

Since these generators are connected in parallel the current values are added. The current amplitude 31 indicates that the generator 1 is adjusted to a very low current. The current value set at the generator 2 is added to that of the first generator 1, so that the amplitude 32 results. The current value adjusted at the generator 3 is finally added to form the current amplitude 33. With the arrangement depicted in FIG. 2, where there are three working pulses which are combined into a working spark 34, it will be recognized that the pulse generator 1 is adjusted with a high voltage amplitude 28 and very low current value. As a result, there is a rapid ignition at the beginning of the working spark in the spark gap. As is well known, for ignition purposes it is not necessary to have a high current. The current values 32, 33 of the work pulses 29, 30 are added with the corresponding time-displacement to form the working spark. Due to the time-displacement of the working pulses 28, 29, 30 with respect to one another and due to the adjustment of the voltage and current values at the individual pulse generators 1, 2 and 3, there is obtained an ascending slope or flank of the working spark 34 of optional configuration or shape. In the same manner, the descending flank or slope of the working spark 34 can be randomly formed. The pulse steps 35 and 36 are derived from the working pulses 28, 29 and 30 depicted in the upper portion of FIG. 2. The random control of the form or shape of the working spark favorably acts upon removal of material at the workpiece 8. The wear at the electrode 7, which previously always occurred and could not be prevented with the known means, is reduced to zero or practically zero. The capability of varying the ascending portion of the working spark 34 accelerates the ignition at the spark gap 6. With the known generators a special ignition pulse is delivered at the beginning of the working spark to the spark erosion gap, this ignition pulse oftentimes being generated asynchronously with respect to the actual working spark. Additionally, this ignition voltage is in a very crass misrelationship with the actual working sparks. On the other hand, with the invention the ascent of the flank or slope portion of the working spark 34 is gentle. This is particularly important if it is necessary to work with spark gaps of different width. During coarse erosion of the workpiece 8 (roughing), there must be maintained a larger spark gap 6 between the electrode 7 and the workpiece 8 and during fine erosion (finishing) a smaller spark gap.

The different spacing between the working electrode 7 and the workpiece 8 requires, for known generators, a change of the set electrical parameters. Thus, for instance, the known pulse generators could not be employed for the fine- or finer-machining operations. In such case, it was necessary to use a generator of the older type construction utilizing a capacitor as the storage element. On the other hand, such is no longer the case with the circuitry of the present invention. Due to the time control of the ascending flank slope of the working spark 34 it is possible to also use, for this machining technique, the modern transistorized pulse generators. This affords a considerable advantage since the modern transistorized generators have much improved efficiency over the old generators with storage elements. In any case, there is achieved an optimum ignition of the working spark due to the variability of its ascending slope or flank. This variability of the ascending flank of the working spark 34 also enables the ionization in the spark gap to diminish in the most favorable way. Consequently, there is achieved a shortening of the deionization time, so that the next working pulse can be ignited at a much shorter time interval than previously possible. Since the physical conditions prevailing in the spark erosion gap are not stationary, rather are dynamic and can change by virtue of uncontrollable external influences, it was previously necessary to contend with disturbances and thus impairment of the erosion metalworking operation. With the invention, the shape or form of the working spark 31 is accommodated to the physical conditions prevailing in the spark gap. This favorable erosion condition has been established by experimentation. A further noteworthy advantage is also realized by virtue of the fact that the adjustment of the form of the working sparks 34 for certain material pairs or matching enables obtaining an optimum metal removal condition. The expression "material pairs" or "match machining" means that for certain materials of the work electrode there is selected a certain other material of the workpiece to be machined. Previously, it was found that only for certain material pairs was it possible to obtain good erosion machining results. With the invention, however, it is no longer necessary to maintain certain material matching between the electrode and the workpiece. It is, in fact, even possible to work materials which previously, because they were considered unsuitable pairs, could not be used.

FIG. 3 depicts a train of control pulses delivered by the timing generator 17 to the time-control current circuits 11, 12, 13, 19, 20 and 21. This figure shows that the timing generator can deliver a continuous pulse train as well as a timewise-interrupted pulse train.

In the same manner it is also possible for the time-control circuits 11, 12, 13, 19, 20 and 21 of FIG. 1 to deliver pulse trains which are interrupted in time to the pulse generators 1, 2 and 3. As already mentioned, this can be achieved by the combined monitoring device 22 on the basis of the analysis of the physical conditions prevailing at the spark erosion gap 6. Upon changes of the physical conditions in the spark erosion gap 6 due to changes in the width of the erosion gap or because of external influences, the combined monitoring device 22 only controls certain time-control circuits, so that the shape or form of the work spark 34 alters. Experiments have shown that upon changing the ascending slope or flank or the descending slope or flank disturbances in the spark erosion gap immediately cease. It is not possible to give a scientific explanation of this phenomenon, since the theoretical principles of the extremely complicated dynamic operations which occur at the spark erosion gap have not been completely explained up to now. Of course, it is possible to vary at the working spark 34 also the voltage and current values by appropriate adjustment at the generators which produce the working pulses 25, 26 and 27.

Finally, it is here mentioned that it is possible to supply, from a timing generator 17, not only a plurality of generators which act upon a spark erosion gap, rather also other generators which operate upon a different spark gap. It has also been found in practice that the particularly large machining electrodes, which, for instance, have been used for the manufacture of punch- or press tools for the automobile body industry, can consist of a plurality of individual electrodes. The inventive circuitry is also capable of use with such type equipment. In so doing, a generator group operates upon a partial electrode. The other partial electrodes are coupled with the other generator groups, so that all of the generator groups act upon a spark gap having a workpiece.

While there is shown and described present preferred embodiments of the invention, it is to be distinctly understood that the invention is not limited thereto but may be otherwise variously embodied and practiced within the scope of the following claims.

What is claimed is:

1. A circuit arrangement for electro-erosion machining operations across a work gap, comprising:
   a. at least two non-storing pulse generator means for the electro-erosion machining operations;
   b. a controlled timing generator means for generating control pulses for all of said pulse generator means;
   c. current circuit means for the time-control of the control pulses delivered by the controlled timing generator means, one such current circuit means being arranged at the input for the control pulses of each of said pulse generator means; and
   d. electro-erosion current circuit means, said pulse generator means being electrically coupled with said electro-erosion current circuit means, said pulse generator means being provided with electronic power switches controlled by said control pulses, said electro-erosion current circuit means being coupled in such number in parallel to the work gap as there are required working pulses of different amplitudes for producing a working spark.

2. The circuit arrangement as defined in claim 1, wherein said current circuit means are arranged in parallel with the output of said controlled timing generator means.

3. The circuit arrangement as defined in claim 1, wherein said current circuit means are connected in series with the output of said controlled timing generator means.

4. The circuit arrangement as defined in claim 1, further including monitoring means for influencing said current circuit means.

5. The circuit arrangement as defined in claim 1, wherein there are provided at least three pulse generator means together with their electro-erosion current circuit means which are connected parallel to the work gap and form a generator group, so that the working spark is composed of three work pulses of different time-duration.

* * * * *